(12) United States Patent
Gouws et al.

(10) Patent No.: US 11,380,034 B2
(45) Date of Patent: Jul. 5, 2022

(54) SEMANTICALLY-CONSISTENT IMAGE STYLE TRANSFER

(71) Applicant: GOOGLE LLC, Mountain View, CA (US)

(72) Inventors: Stephan Gouws, London (GB); Frederick Bertsch, Belmont, CA (US); Konstantinos Bousmalis, London (GB); Amelie Royer, Vienna (AT); Kevin Patrick Murphy, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 250 days.

(21) Appl. No.: 16/759,689

(22) PCT Filed: Oct. 29, 2018

(86) PCT No.: PCT/US2018/058044
§ 371 (c)(1),
(2) Date: Apr. 27, 2020

(87) PCT Pub. No.: WO2019/084562
PCT Pub. Date: May 2, 2019

(65) Prior Publication Data
US 2020/0342643 A1     Oct. 29, 2020

(30) Foreign Application Priority Data

Oct. 27, 2017   (GR) ............................. 20170100484

(51) Int. Cl.
*G06T 11/60*      (2006.01)
*G06F 16/55*      (2019.01)
*G06N 3/04*       (2006.01)

(52) U.S. Cl.
CPC .............. *G06T 11/60* (2013.01); *G06F 16/55* (2019.01); *G06N 3/04* (2013.01)

(58) Field of Classification Search
CPC ........... G06T 11/60; G06F 16/55; G06N 3/04; G06N 3/088; G06N 3/0454
(Continued)

(56) References Cited

U.S. PATENT DOCUMENTS 10,198,839 B2 *   2/2019   Rymkowski ............ G06T 11/60
10,552,968 B1 *   2/2020   Wang ....................... G06T 7/248

OTHER PUBLICATIONS

Ganin et al. "Domain-adversarial training of neural networks," J. Mach. Learn. Res., 17(1), Jan. 2016, 35 pages.
(Continued)

*Primary Examiner* — Neil R McLean
(74) *Attorney, Agent, or Firm* — Fish & Richardson P.C.

(57) ABSTRACT

Methods, systems, and apparatus, including computer programs encoded on computer storage media, for semantically-consistent image style transfer. One of the methods includes: receiving an input source domain image; processing the source domain image using one or more source domain low-level encoder neural network layers to generate a low-level representation; processing the low-level representation using one more high-level encoder neural network layers to generate an embedding of the input source domain image; processing the embedding using one or more high-level decoder neural network layers to generate a high-level feature representation of features of the input source domain image; and processing the high-level feature representation of the features of the input source domain image using one or more target domain low-level decoder neural network layers to generate an output target domain image that is from the target domain but that has similar semantics to the input source domain image.

18 Claims, 5 Drawing Sheets

(58) Field of Classification Search
USPC .......................................................... 382/276
See application file for complete search history.

(56) References Cited

OTHER PUBLICATIONS

Kim et al. "Learning to discover cross-domain relations with generative adversarial networks," arXiv 1703.05192v2, May 15, 2017, 10 pages.

Li et al. "Large-Scale Domain Adaptation via Teacher-Student Learning," Interspeech, Aug. 17, 2017, 5 pages.

Liu et al. "Unsupervised Image-to-Image Translation Networks," arXiv 1703.00848v4, Oct. 9, 2017, 11 pages.

Pan et al. "A Survey on Transfer Learning, IEEE Transactions on Knowledge and Data Engineering," vol. 22(10) Oct. 1, 2010, 15 pages.

PCT International Preliminary Report on Patentability issued in International Application No. PCT/US2018/058044, dated May 7, 2020, 17 pages.

PCT International Search Report and Written Opinion issued in International Application No. PCT/US2018/058044, dated Feb. 20, 2019, 23 pages.

Royer et al. "XGAN: Unsupervised Image-to-Image Translation for Many-to-Many Mappings," arXiv 1711.05139, Jul. 10, 2018, 19 pages.

Taigman et al. "Deepface: Closing the gap to human-level performance in face verification," Conference on computer Vision and Pattern Recognition, Jun. 2014, 8 pages.

Taigman et al. "Unsupervised cross-domain image generation," arXiv 1611.02200, Nov. 7, 2016, 14 pages.

Wolf et al. "Unsupervised Creation of Parameterized Avatars," IEEE International Conference on Computer Vision, Jul. 9, 2017, 13 pages.

Zhu et al. "Unpaired image-to-image translation using cycle-consistent adversarial networks," Proceedings of the IEEE International Conference on Computer Vision, Jul. 21-26, 2017, 10 pages.

* cited by examiner

SEMANTICALLY-CONSISTENT IMAGE STYLE TRANSFER

CROSS-REFERENCE TO RELATED APPLICATION

This application claims priority to Application Serial Number 20170100484, filed on Oct. 27, 2017 with the Hellenic Industrial Property Organization, the entire contents of which are hereby incorporated by reference.

BACKGROUND

This specification relates to modifying images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, this specification describes a system that is implemented by one or more computers and that receives an image from a source domain and transforms the image into an image from a target domain that has similar semantics to the source domain image.

Particular embodiments of the subject matter described in this specification can be implemented so as to realize one or more of the following advantages. The system as described in this specification can effectively adapt source domain images to appear as if drawn from a target domain. In particular, the adapted source domain image can appear as if drawn from the target domain while preserving the semantics of the source domain image, i.e., without altering the semantic content of the source domain image. In other words, the system effectively transfers the style of an input source domain image to the style of the target domain while keeping the content of the source domain image consistent. The system can effectively train a neural network system to perform the adaptation using only a collection of images from the source domain and a collection of images from the target domain and does not require any pairings between the images in the two collections. Thus, the system requires only data that is readily available and does not require paired images, which may be costly to generate or obtain.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
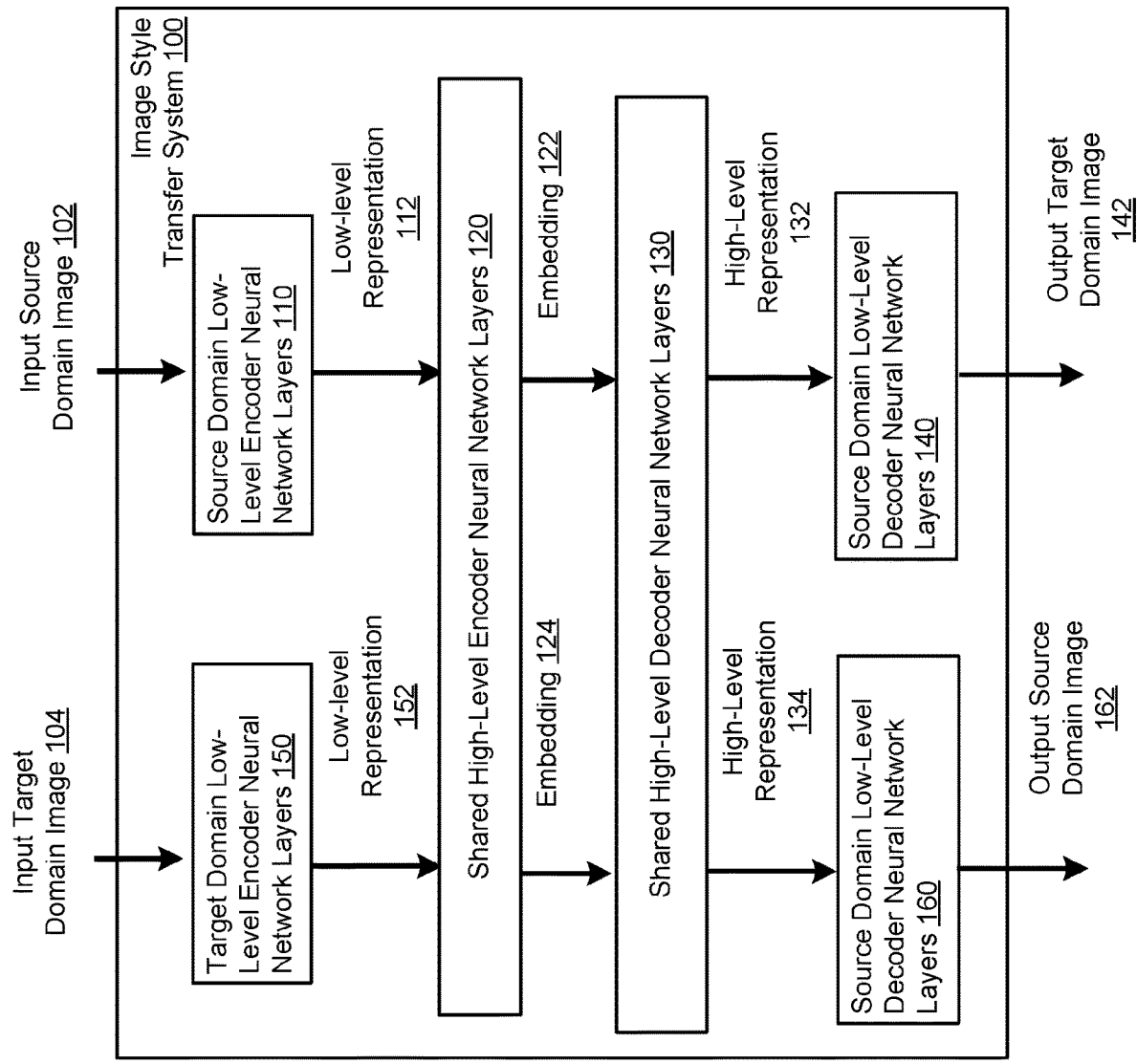
FIG. 1 shows an example style transfer system.

In general, this specification describes a system that is implemented by one or more computers and that receives an image from a source domain and transforms the image into an image from a target domain that has similar semantics to the source domain image.

Generally, the source domain is different from the target domain. In particular, the distribution of pixel values in images from the source domain is different from the distribution of pixel values in images from the target domain. Thus, two images that have the same semantics will look different if one is from the source domain and the other is from the target domain.

In one example, the source domain may be images of a virtual environment that simulates a real-world environment and the target domain may be images of the real-world environment.

For example, the source domain images may be images of a virtual environment that simulates a real-world environment that is to be interacted with by a robot or other mechanical agent or by an autonomous or semi-autonomous vehicle, while the target domain images may be images of the real-world environment as captured by the mechanical agent or the vehicle. Thus, the source domain images may be more expansive, in particular for edge cases that occur rarely or are difficult or dangerous to generate in the real-world environment. By transforming source domain images into target domain images while developing a control policy for the agent or vehicle or while training a neural network that is used to select actions to be performed by the agent or vehicle, the performance of the agent or vehicle in the real-world environment may be improved, even if certain situations are only encountered in the simulated version of the environment.

In another example, the source and target domains may both be real-world images, but with photometric differences, e.g., one domain may be indoor images and the other domain may be outdoor images of similar objects.

As another example, the source domain may be images of the real-world and the target domain may be paintings or drawings of the real-world or images of the real-world that have been digitally edited in some way. As another example, the target domain may be the images of the real-world and the source domain may be the paintings or drawings or images that have been edited in some way. As more specific examples, the source domain may be photographs of people and the target domain may be cartoons or other illustrations of people or vice versa, or the source domain may be landscape images and the target domain may be landscape paintings or vice versa.

In some cases, the source and target domains differ primarily in terms of the distribution of low-level image statistics rather than high-level image statistics. Examples of low-level differences in the distributions include those arising due to noise, resolution, illumination and color. High-level differences, on the other hand, may include differences that relate to the number of classes, the types of objects, and geometric variations, such as 3D position.

In some cases, the source domain may be a domain in which labeled images are easily available, while obtaining labeled image data for the target domain is computationally expensive or otherwise difficult or infeasible.

FIG. 1 shows an example style transfer system 100. The style transfer system 100 is an example of a system implemented as computer programs on one or more computers in one or more locations, in which the systems, components, and techniques described below can be implemented.

The style transfer system 100 is a system that transforms input source domain images 102 into output target domain images 142 and, at least during training, transforms input target domain images 104 in output source domain images 162.

In particular, to transform an input source domain image 102, the system 100 processes the source domain image 102 using one or more source domain low-level encoder neural network layers 110 that are specific to images from the source domain to generate a low-level representation 112 of the input source domain image. That is, the source domain low-level encoder neural network layers 110 are only used when encoding images from the source domain, and not when encoding images from the target domain. The low-level representation is the output of the last of the low-level encoder layers and can be a feature map that has a lower spatial dimensionality than the input image but a higher depth dimension. For example, if the image is 64×64×3, the feature map could be 16×16×64 or 8×8×128.

The system 100 then processes the low-level representation 112 using one more high-level encoder neural network layers 120 that are shared between images from the source and target domains to generate an embedding 122 of the input source domain image 102. That is, the high-level encoder neural network layers 120 are used when encoding source domain images and target domain images. An embedding of an image is an ordered collection of numeric values, e.g., a vector of floating point or other numeric values, that represents the image and that generally has a much smaller size than the image. For example, the embedding may be a 612, 1024, or 2048 dimensional vector.

The system processes the embedding 122 of the input source domain image using one or more high-level decoder neural network layers 130 that are shared between images from the source and target domains to generate a high-level feature representation 132 of features of the input source domain image 102. The high-level feature representation is the output of the last of the high-level decoder layers and can be a feature map that has a lower spatial dimensionality than the input and output images but a higher depth dimension. For example, if the images are 64×64×3, the feature map could be 16×16×128 or 8×8×256.

The system 100 then processes the high-level feature representation 132 of the features of the input source domain image using one or more target domain low-level decoder neural network layers 140 that are specific to generating images from the source domain to generate an output target domain image 142 that is from the target domain but that has similar semantics to the input source domain image 102. That is, the output target domain image 142 has a distribution of pixel values that matches those of images from the target domain but has similar semantics to the input source domain image 102.

During training, the system 100 is also configured to generate output source domain images 162 from input target domain images 104, i.e., to transform target domain images to source domain images that have similar semantics as the original target domain images.

In particular, to transform an input target domain image 104, the system 100 processes the target domain image 104 using one or more target domain low-level encoder neural network layers 150 that are specific to images from the target domain to generate a low-level representation 152 of the input source domain image. That is, the target domain low-level encoder neural network layers 150 are only used when encoding images from the target domain, and not when encoding images from the source domain.

The system 100 then processes the low-level representation 152 using the one more high-level encoder neural network layers 120 that are shared between images from the source and target domains to generate an embedding 124 of the input target domain image 104.

The system processes the embedding 142 of the input target domain image using the one or more high-level decoder neural network layers 130 that are shared between images from the source and target domains to generate a high-level feature representation 134 of features of the target domain image 104.

The system 100 then processes the high-level feature representation 134 of the features of the input target domain image using one or more source domain low-level decoder neural network layers 160 that are specific to generating images from the source domain to generate an output source domain image 162 that is from the source domain but that has similar semantics to the input target domain image 104. That is, the output source domain image 162 has a distribution of pixel values that matches those of images from the source domain but has similar semantics to the input target domain image 104.

Generally, the source domain low-level encoder neural network layers have the same architecture as the target domain low-level encoder neural network layers but have different parameters due to training. Similarly, the source domain low-level decoder neural network layers have the same architecture as but different parameter values from the target domain low-level decoder neural network layers.

More specifically, together the low-level encoder neural network layers and the high-level encoder neural network layers make up a deep convolutional encoder neural network that maps an input image to an embedding in the embedding space. For example, the convolutional encoder neural network can include multiple convolutional blocks of convolutional layers that each decrease the dimensionality of the input image until the final block generates the embedding. In these cases, the low-level encoder neural network layers can be the first one or more blocks of the multiple convolutional blocks and the high-level encoder neural network layers can be the remaining blocks of the multiple convolutional blocks. In a particular example, if the deep convolutional encoder includes five blocks of convolutional layers, the first three blocks can be the low-level encoder neural network layers and the last two blocks can be the high-level encoder neural network layers. To increase representational capacity, the encoder may also include one or more fully connected layers that do not modify the size of their inputs after the last convolutional block. These fully connected layers can also be part of the shared high-level encoder neural network layers.

Similarly, together the high-level decoder neural network layers and the low-level decoder neural network layers make up a deep deconvolutional decoder neural network that maps an embedding in the embedding space to an output image. For example, the deconvolutional encoder neural network can include multiple deconvolutional blocks of convolutional layers that each increase the dimensionality of the embedding until the final block generates the output image. In these cases, the high-level decoder neural network layers can be the first one or more blocks of the multiple deconvolutional blocks and the low-level decoder neural network layers can be the remaining blocks of the multiple deconvolutional blocks. In a particular example, if the deep deconvolutional encoder includes five blocks of deconvolutional layers, the first two blocks can be the high-level decoder neural network layers and the last three blocks can be the low-level encoder neural network layers.

A particular example of the architecture of the encoder neural network layers and the decoder neural network layers is shown in Table 1 below, with "cony" denoting a convolutional block, "fc" denoting a fully connected layer, "deconv" denoting a deconvolutional block, and (//) denoting layers that are shared between domains. Layers without the (///) notation are not shared between domains.

TABLE 1

| Layer | Size |
|---|---|
| (a) Encoder | |
| Inputs | 64 × 64 × 3 |
| conv1 | 32 × 32 × 32 |
| conv2 | 16 × 16 × 64 |
| (///) conv3 | 8 × 8 × 128 |
| (///) conv4 | 4 × 4 × 256 |
| (///) FC1 | 1 × 1 × 1024 |
| (///) FC2 | 1 × 1 × 1024 |
| (b) Decoder | |
| Inputs | 1 × 1 × 1024 |
| (///) deconv1 | 4 × 4 × 512 |
| (///) deconv2 | 8 × 8 × 256 |
| deconv3 | 16 × 16 × 128 |
| deconv4 | 32 × 32 × 64 |
| deconv5 | 64 × 64 × 3 |

So that source domain images can be effectively adapted to the target domain, i.e., so that the generated target domain images appear to be from the target domain but maintain the semantics of the corresponding source domain images, the system 100 trains the encoder and decoder neural networks jointly, i.e., trains the source domain low-level encoder neural network layers, the high-level encoder neural network layers, the high-level decoder neural network layers, and the target domain low-level decoder neural network layers jointly with the one or more target domain low-level encoder neural network layers and the one or more source domain low-level decoder neural network layers. Training these neural networks will be described in more detail below with reference to FIGS. 4A and 4B.

In some implementations, after the training, the system 100 is only configured to perform source domain to target domain style transfer, i.e., the system 100 is implemented without including the target low-level encoder layers and the source low-level encoder layers. In particular, in some cases, transferring images from the target domain to the source domain is only useful as a way to improve the training of the components used to transfer images from the source domain to the target domain and the target low-level encoder layers and the source low-level encoder layers are therefore unnecessary after training has completed.

In some implementations, after training, the system 100 receives input source domain images from users, e.g., submitted to the system over a data communication network using a user computer, and transmits the generated target domain images over the data communication network for presentation to the users, e.g., on the user computers.

In some other implementations, the system 100 is part of or in communication with a different system that provides the input source domain images to the system 100 and processes the output target domain images generated by the system 100. For example, the images may be images of an environment being interacted with by a robotic agent and the different system can be a control system for a robotic agent that i) uses the output images in learning a control policy for the robotic agent, ii) uses the output images to control the robot, or both.

Figure 2:
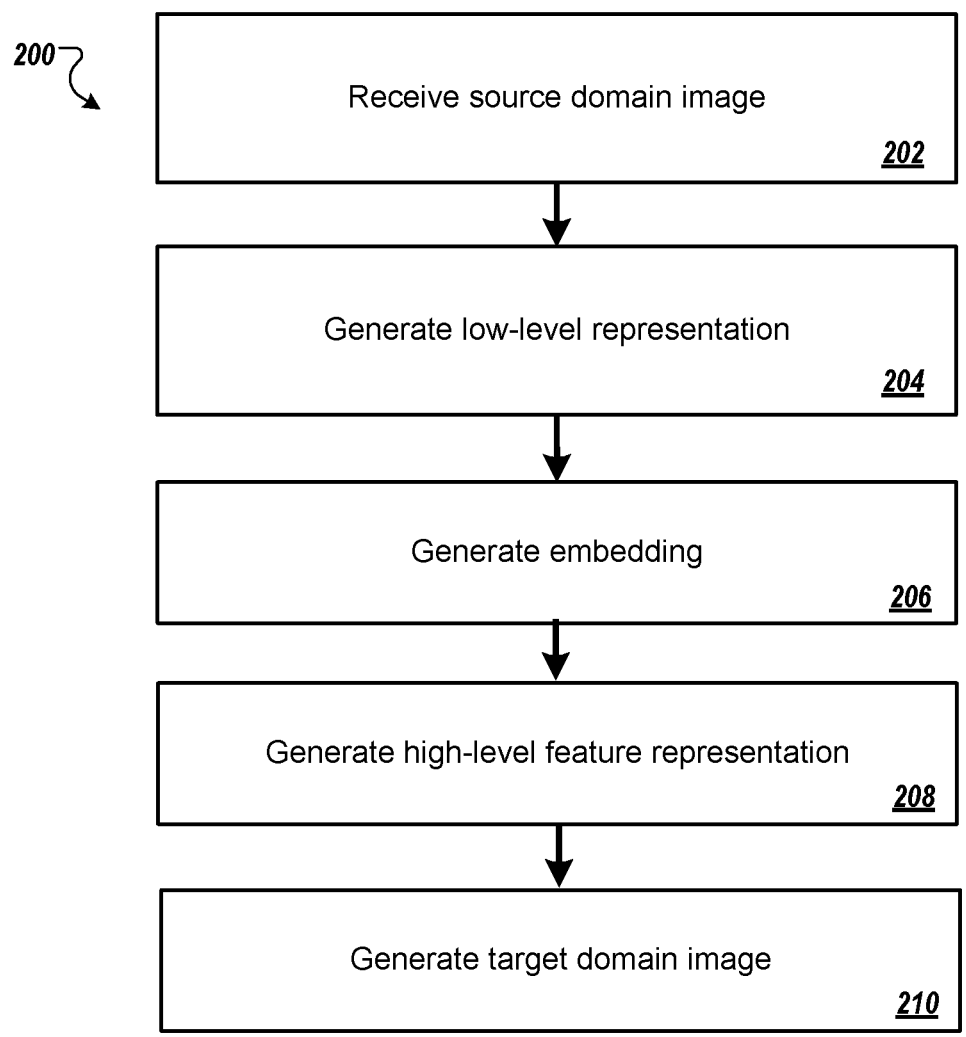
FIG. 2 is a flow diagram of an example process for generating a target domain image from an input source domain image.

FIG. 2 is a flow diagram of an example process 200 for generating a target domain image from a source domain image. For convenience, the process 200 will be described as being performed by a system of one or more computers located in one or more locations. For example, a style transfer system, e.g., the style transfer system 100 of FIG. 1, appropriately programmed, can perform the process 200.

The system receives an image from the source domain (step 202).

The system processes the source domain image using one or more source domain low-level encoder neural network layers that are specific to images from the source domain to generate a low-level representation of the input source domain image (step 204).

The system processes the low-level representation using one more high-level encoder neural network layers that are shared between images from the source and target domains to generate an embedding of the input source domain image (step 206).

The system processes the embedding of the input source domain image using one or more high-level decoder neural network layers that are shared between images from the source and target domains to generate a high-level feature representation of features of the input source domain image (step 208).

The system processes the high-level feature representation of the features of the input source domain image using one or more target domain low-level decoder neural network layers that are specific to generating images from the target domain to generate an output target domain image that is from the target domain but that has similar semantics to the input source domain image (step 210).

Figure 3:
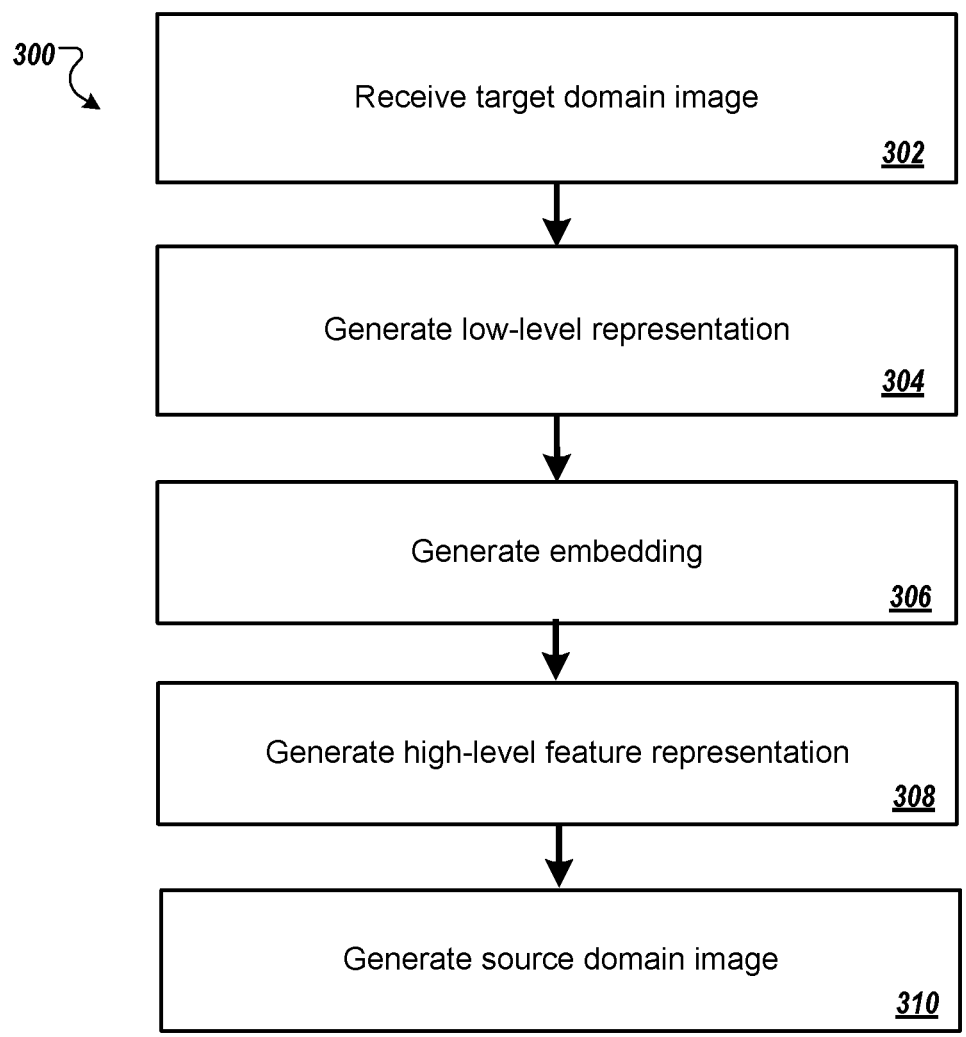
FIG. 3 is a flow diagram of an example process for generating a source domain image from an input source domain image.

FIG. 3 is a flow diagram of an example process 300 for generating a source domain image from a target domain image. For convenience, the process 300 will be described as being performed by a system of one or more computers located in one or more locations. For example, a style transfer system, e.g., the style transfer system 100 of FIG. 1, appropriately programmed, can perform the process 300.

The system receives an image from the target domain (step 302).

The system processes the target domain image using one or more target domain low-level encoder neural network layers that are specific to images from the target domain to generate a low-level representation of the input target domain image (step 304).

The system processes the low-level representation using the one more high-level encoder neural network layers that are shared between images from the source and target domains to generate an embedding of the input target domain image (step 306).

The system processes the embedding of the input target domain image using the one or more high-level decoder neural network layers that are shared between images from the source and target domains to generate a high-level feature representation of features of the input target domain image (step 308).

The system processes the high-level feature representation of the features of the input target domain image using one or more source domain low-level decoder neural network layers that are specific to generating images from the source domain to generate an output source domain image that is from the source domain but that has similar semantics to the input source domain image (step 310).

Figure 4A:
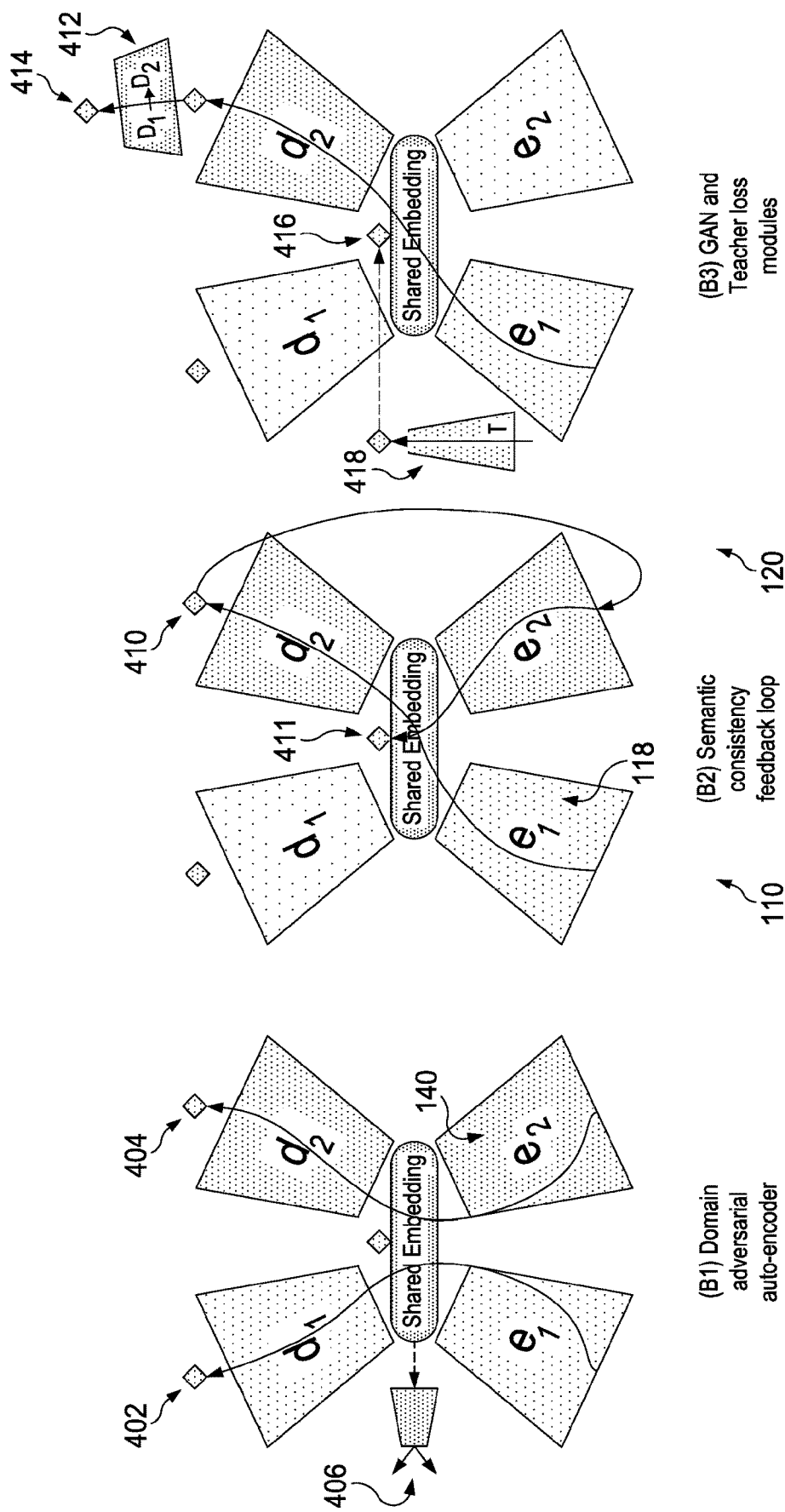
FIG. 4A is a diagram depicting the training of a neural network to perform style transfer.

FIG. 4A is a diagram 400 depicting the training of a neural network to perform style transfer.

In particular, in the diagram 400, $e_1$ is a source domain encoder neural network that is made up of the source domain low-level encoder layers and the shared high-level encoder layers, $e_2$ is a target domain encoder neural network that is made up of the target domain low-level encoder layers and the shared high-level encoder layers, $d_1$ is a source domain decoder neural network that is made up of the shared high-level decoder layers and the source domain low-level decoder layers, and $d_2$ is a target domain decoder neural network that is made up of the shared high-level decoder layers and the target domain low-level decoder layers.

The diagram 400 shows the processing necessary to compute five loss terms that are included in a loss function used to jointly train the neural networks e1, e2, d1, and d2.

In particular, the (B1) portion of the diagram shows the processing necessary to determine a reconstruction loss and a domain-adversarial (DANN) loss.

The reconstruction loss encourages the embeddings generated by the encoders to encode meaningful knowledge for each domain. In other words, the reconstruction loss encourages the model to encode enough information in the embeddings for each domain for to perfectly reconstruct the input. In particular, the reconstruction loss is the sum of reconstruction losses for each domain.

For the source domain, the reconstruction loss is a distance measure, e.g., the norm of the differences in corresponding pixel values, between (i) an original source domain image and (ii) an output source domain image 402 generated by processing the original source domain image through the source domain encoder neural network $e_1$ to generate an embedding and then processing the embedding through the source domain decoder neural network $d_1$ to generate the output source domain image 402.

For the target domain, the reconstruction loss depends is an error between (i) an original target domain image and (ii) an output target domain image 404 generated by processing the original target domain image through the target domain encoder neural network $e_2$ to generate an embedding and then processing the embedding through the target domain decoder neural network $d_2$ To generate the output target domain image.

The DANN loss pushes the embeddings generated from the source and target domains to lie in the same subspace, bridging the domain gap at the semantic level.

To determine the DANN loss, the neural networks are trained jointly with a classifier 406 that is configured to receive an embedding of an input image and to process the embedding to classify the input image as either being a target domain image or a source domain image. That is, the DANN loss is based on the classification score generated by the classifier 406 for a given input image. In particular, the DANN loss can be a sum of (i) a classification loss, e.g., a cross-entropy loss, between a correct classification score for a source domain image and the classification score generated by the classifier 406 for an input source domain image and (ii) a corresponding classification loss for target domain images.

During training, the system maximizes the loss with respect to the classifier parameters to improve the accuracy of the classifier and minimizes the loss with respect to the encoder network parameters to decrease the accuracy of the classifier. This maximization-minimization scheme can be realized by including a gradient reversal layer as the input layer of the classifier 406 and minimizing the overall loss.

The (B2) portion of the diagram shows the processing necessary to determine a semantic consistency loss. The semantic consistency loss ensures that the semantics of the input image are preserved after the domain of the image has been translated and includes a respective loss term for the source domain and the target domain that each measure how close an embedding of an input image is to the embedding of an output image generated by translating the input image to the other domain. In other words, this loss encourages embeddings of images to be preserved even after the images are translated to the other domain.

More concretely, the semantic consistency loss term is the sum of the semantic consistency loss for the source domain and the semantic consistency loss for the target domain.

The semantic consistency loss for the source domain is the error between (i) an embedding of an original source domain image and (ii) an embedding 411 of a target domain image 410 generated by translating the original source domain image into the target domain.

Similarly, the semantic consistency loss for the target domain is the error between (i) an embedding of an original target domain image and (ii) an embedding of a source domain image generated by translating the original source domain image into the target domain.

The (B3) portion of the diagram shows the processing necessary to determine a teacher loss and a generative adversarial (GAN) objective.

The GAN objective encourages the neural networks to generate more realistic output images. To optimize the GAN objective, the system trains the neural networks jointly with a discriminator 412 that is configured to receive an input image and to process the input image and to classify the input image as either originally being from the target domain or as being adapted into the target domain from the source domain. In particular, during the training, the discriminator 412 receives output target domain images generated by the decoder $d_2$ and original target domain images and generates a classification score 414 that classifies the input image as either originally being from the target domain or as being adapted into the target domain from the source domain.

The GAN objective measures the accuracy of the classification scores generated by the discriminator 412 on the real original target domain images and the generated output target domain images. By maximizing the objective with respect to the discriminator parameters and minimizing the objective with respect to the source encoder and target decoder parameters, the system trains discriminator to improve the accuracy while training the source encoder and target decoder to decrease the accuracy, i.e., to generate images that realistic enough to cause the discriminator perform poorly.

In some implementations, the system also trains the neural networks jointly with a similar discriminator that is configured to receive an input image and to process the input image and to classify the input image as either originally being from the source domain or as being adapted into the source domain from the target domain. The system can incorporate a corresponding objective term from the other discriminator into the GAN objective.

The teacher loss distills prior knowledge from a fixed pretraining teacher embedding, when available. In particular, when the teacher loss is used, the system has access to a pre-trained teacher neural network 418 that receives a source domain image to generate a teacher embedding of the source domain image. The teacher loss measures a distance between the embedding 416 generated by the source encoder and the teacher embedding generated for the pre-trained teacher neural network 418.

Figure 4B:
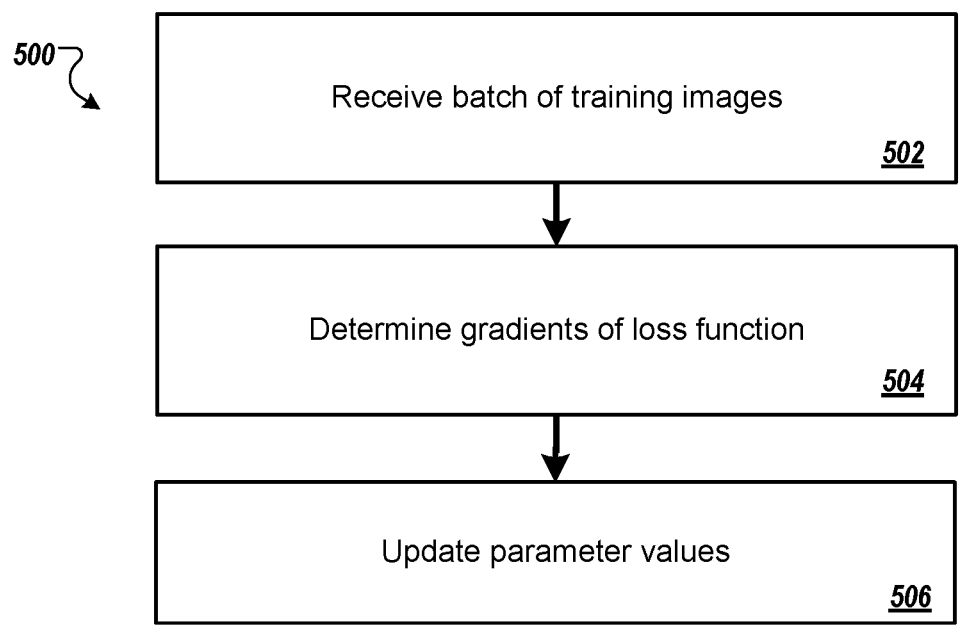
FIG. 4B is a flow diagram of an example process for training a neural network to perform style transfer.

FIG. 4B is a flow diagram of an example process 500 for performing an iteration of training a shared encoder neural network and a classifier neural network. For convenience, the process 500 will be described as being performed by a system of one or more computers located in one or more locations. For example, a style transfer system, e.g., the style transfer system 100 of FIG. 1, appropriately programmed, can perform the process 500.

The system receives a batch of training images that includes training source domain images and training target domain images (step 502).

The system determines respective gradients of a loss function for each image in the batch (step 504). In particular, the loss function can be a weighted sum of some or all of the losses described above with reference to FIG. 4A.

To determine the gradient of the semantic consistency loss for the source domain for a training source domain image in the batch, the system performs the following operations: processing the training input source domain image using the source domain low-level encoder neural network layers to generate a low-level representation of the training input source domain image; processing the low-level representation using the high-level encoder neural network layers to generate an embedding of the training input source domain image; processing the embedding of the training input source domain image using the one or more high-level decoder neural network layers to generate a high-level feature representation of features of the training input source domain image; and processing the high-level feature representation of the features of the training input source domain image using the one or more target domain low-level decoder neural network layers to generate a training output target domain image that is from the target domain; processing the training output target domain image using the one or more target domain low-level encoder neural network layers to generate a low-level representation of the training output target domain image; processing the low-level representation using the one more high-level encoder neural network layers to generate an embedding of the training output target domain image; and determining a first gradient of the semantic consistency loss function that reduces a distance measure between the embedding of the training output target domain image and the embedding of the training input source domain image.

To determine the gradient of the semantic consistency loss for the target domain for a target domain image in the batch, the system performs the following operations: processing the training input target domain image using the target domain low-level encoder neural network layers to generate a low-level representation of the training input target domain image; processing the low-level representation using the high-level encoder neural network layers to generate an embedding of the training input target domain image; processing the embedding of the training input target domain image using the one or more high-level decoder neural network layers to generate a high-level feature representation of features of the training input target domain image; and processing the high-level feature representation of the features of the training input target domain image using the one or more source domain low-level decoder neural network layers to generate a training output source domain image that is from the source domain; processing the training output source domain image using the one or more source domain low-level encoder neural network layers to generate a low-level representation of the training output target domain image; processing the low-level representation using the one more high-level encoder neural network layers to generate an embedding of the training output source domain image; and determining a second gradient of the semantic consistency loss function that reduces a distance measure between the embedding of the training output source domain image and the embedding of the training input target domain image.

To determine the gradient of the reconstruction loss for the training source domain image, the system performs the following operations: processing the high-level feature representation of the features of the training input source domain image using the one or more source domain low-level decoder neural network layers to generate a training output source domain image; and determining a gradient of the reconstruction loss function that reduces a distance measure between the embedding of the training output source domain image and the embedding of the training input source domain image.

To determine the gradient of the reconstruction loss for the training target domain image, the system performs the following operations: processing the high-level feature representation of the features of the training input target domain image using the one or more target domain low-level decoder neural network layers to generate a training output target domain image; and determining a gradient of the reconstruction loss function that reduces a distance measure between the embedding of the training output target domain image and the embedding of the training input target domain image.

To determine the gradient of the classification loss for the source domain image, the system processes the embedding of the training input source domain image using the classifier to generate a classification of the training input source domain image; and determines a gradient of the classification loss function that decreases an accuracy of the classification generated by the classifier To determine the gradient of the classification loss for the target domain image, the system processes the embedding of the training input target domain image using the classifier to generate a classification of the training input target domain image; and determines a gradient of the classification loss function that decreases an accuracy of the classification generated by the classifier.

The system also determines a gradient of the target and source domain classification loss with respect to the classifier parameters to increase the accuracy of the classification generated by the classifier and updates, using the gradient, current values of the parameters of the classifier. This can be done using the gradient reversal layer described above.

To determine the gradient of the discriminator loss, the system processes the training output target domain image using the discriminator to generate a classification of the training output target domain image; and determines a gradient of the discriminator loss function that decreases an accuracy of the classification generated by the discriminator.

The system also determines a gradient of the discriminator loss function with respect to the discriminator parameters, i.e., a gradient that increases an accuracy of the classification generated by the discriminator; and updates, using the gradient, current values of the parameters of the discriminator. This can be done by first freezing the values of the discriminator parameters and computing the gradient with respect to the parameters of the other neural networks and then freezing the values of the parameters of the other neural networks and then computing the gradient with respect to the parameters of the discriminator.

To determine the gradient of the teacher loss, the system processes the training input source domain image using a pre-trained teacher network to generate a teacher embedding of the input source domain image; and determines a gradient of a teacher loss function that decreases a distance measure between the embedding of the input source domain image and the teacher embedding of the input source domain image.

Generally, the system computes these gradients by backpropagation through the appropriate neural network layers.

The system adjusts, using the gradients, the current values of the parameters of the the source domain low-level encoder neural network layers, the high-level encoder neural network layers, the high-level decoder neural network layers, the target domain low-level decoder neural network layers, the target domain low-level encoder neural network layers and the source domain low-level encoder neural network layers (step 416). In particular, the system can sum the gradients or determine a weighted sum of the gradients according to fixed weights applied to each loss term and then apply the added gradients to the current parameter values in accordance with an update rule, e.g., an ADAM update rule, an rmsprop update rule, or a SGD learning rate.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving an input source domain image from a source domain;
processing the source domain image using one or more source domain low-level encoder neural network layers that are specific to images from the source domain to generate a low-level representation of the input source domain image;
processing the low-level representation using one more high-level encoder neural network layers that are shared between images from the source and target domains to generate an embedding of the input source domain image;
processing the embedding of the input source domain image using one or more high-level decoder neural network layers that are shared between images from the source and target domains to generate a high-level feature representation of features of the input source domain image; and processing the high-level feature representation of the features of the input source domain image using one or more target domain low-level decoder neural network layers that are specific to generating images from the target domain to generate an output target domain image that is from the target domain but that has similar semantics to the input source domain image.

2. The method of claim 1, further comprising:
receiving an input target domain image from a target domain;
processing the input target domain image using one or more target domain low-level encoder neural network layers that are specific to images from the target domain to generate a low-level representation of the input target domain image;
processing the low-level representation using the one or more high-level encoder neural network layers that are shared between images from the source and target domains to generate an embedding of the input target domain image;
processing the embedding of the input target domain image using the one or more high-level decoder neural network layers that are shared between images from the source and target domains to generate a high-level feature representation of features of the input target domain image; and
processing the high-level feature representation of the features of the target source domain image using one or more source domain low-level decoder neural network layers that are specific to generating images from the source domain to generate an output source domain image that is from the source domain but that has similar semantics to the input target domain image.

3. The method of claim 1, wherein the source domain low-level encoder neural network layers, the high-level encoder neural network layers, the high-level decoder neural network layers, and the target domain low-level decoder neural network layers have been trained jointly with one or more target domain low-level encoder neural network layers and one or more source domain low-level decoder neural network layers.

4. The method of claim 2, wherein the source domain low-level encoder neural network layers have a same architecture as the target domain low-level encoder neural network layers but different parameter values.

5. The method of claim 2, wherein the source domain low-level decoder neural network layers have a same architecture as the target domain low-level decoder neural network layers but different parameter values.

6. A method of training source domain low-level encoder neural network layers, high-level encoder neural network layers, high-level decoder neural network layers, target domain low-level decoder neural network layers, target domain low-level encoder neural network layers and source domain low-level encoder neural network layers, the method comprising:
receiving a training input source domain image from a source domain;
processing the training input source domain image using the source domain low-level encoder neural network layers to generate a low-level representation of the training input source domain image;
processing the low-level representation using the high-level encoder neural network layers to generate an embedding of the training input source domain image;
processing the embedding of the training input source domain image using the one or more high-level decoder neural network layers to generate a high-level feature representation of features of the training input source domain image; and
processing the high-level feature representation of the features of the training input source domain image using the one or more target domain low-level decoder neural network layers to generate a training output target domain image that is from a target domain;
processing the training output target domain image using the one or more target domain low-level encoder neural network layers to generate a low-level representation of the training output target domain image;
processing the low-level representation using the one more high-level encoder neural network layers to generate an embedding of the training output target domain image;
determining a first gradient of a semantic consistency loss function that reduces a distance measure between the embedding of the training output target domain image and the embedding of the training input source domain image; and
updating, using the first gradient, current values of the parameters of the source domain low-level encoder neural network layers, the high-level encoder neural network layers, the high-level decoder neural network layers, the target domain low-level decoder neural network layers, and the target domain low-level encoder neural network layers.

7. The method of claim 6, further comprising:
receiving a training input target domain image from the target domain;
processing the training input target domain image using the target domain low-level encoder neural network layers to generate a low-level representation of the training input target domain image;
processing the low-level representation using the high-level encoder neural network layers to generate an embedding of the training input target domain image;
processing the embedding of the training input target domain image using the one or more high-level decoder neural network layers to generate a high-level feature representation of features of the training input target domain image; and
processing the high-level feature representation of the features of the training input target domain image using the one or more source domain low-level decoder neural network layers to generate a training output source domain image that is from the source domain;
processing the training output source domain image using the one or more source domain low-level encoder neural network layers to generate a low-level representation of the training output target domain image;
processing the low-level representation using the one more high-level encoder neural network layers to generate an embedding of the training output source domain image;
determining a second gradient of a semantic consistency loss function that reduces a distance measure between the embedding of the training output source domain image and the embedding of the training input target domain image; and
updating, using the second gradient, current values of the parameters of the target domain low-level encoder neural network layers, source domain low-level encoder neural network layers, the high-level encoder neural network layers, the high-level decoder neural network layers, and the source domain low-level decoder neural network layers.

8. The method of claim 6, further comprising:
processing the high-level feature representation of the features of the training input source domain image using the one or more source domain low-level decoder neural network layers to generate a training output source domain image;
determining a gradient of a reconstruction loss function that reduces a distance measure between the embedding of the training output target domain image and the embedding of the training input source domain image; and
updating, using the gradient, current values of the parameters of the source domain low-level encoder neural network layers, the high-level encoder neural network layers, the high-level decoder neural network layers, and the source domain low-level decoder neural network layers.

9. The method of claim 6, wherein the training is performed jointly with the training of a classifier that is configured to receive an embedding of an input image and to process the embedding to classify the input image as either being a target domain image or an image that was adapted from the source domain, and wherein the method further comprises:
processing the embedding of the training input source domain image using the classifier to generate a classification of the training input source domain image;
determining a gradient of a classification loss function that decreases an accuracy of the classification generated by the classifier; and
updating, using the gradient, current values of the parameters of the source domain low-level encoder neural network layers and the high-level encoder neural network layers.

10. The method of claim 9, further comprising:
determining a gradient of a classification loss function that increases the accuracy of the classification generated by the classifier; and
updating, using the gradient, current values of the parameters of the classifier.

11. The method of claim 6, further comprising:
wherein the training is performed jointly with the training of a discriminator that is configured to receive an input image and to process the input image and to classify the input image as either being from the source domain or the target domain, and wherein the method further comprises:
processing the training output target domain image using the discriminator to generate a classification of the training output target domain image;
determining a gradient of a discriminator loss function that decreases an accuracy of the classification generated by the discriminator; and
updating, using the gradient, current values of the parameters of the source domain low-level encoder neural network layers, the high-level encoder neural network layers, the high-level decoder neural network layers, and the target domain low-level decoder neural network layers.

12. The method of claim 11, further comprising:
determining a gradient of a discriminator loss function that increases an accuracy of the classification generated by the discriminator; and
updating, using the gradient, current values of the parameters of the discriminator.

13. The method of claim 6, further comprising:
processing the training input source domain image using a pre-trained teacher network to generate a teacher embedding of the input source domain image; and
determining a gradient of a teacher loss function that decreases a distance measure between the embedding of the input source domain image and the teacher embedding of the input source domain image; and
updating, using the gradient, current values of the parameters of the source domain low-level encoder neural network layers and the high-level encoder neural network layers.

14. A system comprising one or more computers and one or more storage devices storing instructions that when implemented by the one or more computers cause the one or more computers to perform operations comprising:
receiving an input source domain image from a source domain;
processing the source domain image using one or more source domain low-level encoder neural network layers that are specific to images from the source domain to generate a low-level representation of the input source domain image;
processing the low-level representation using one more high-level encoder neural network layers that are shared between images from the source and target domains to generate an embedding of the input source domain image;
processing the embedding of the input source domain image using one or more high-level decoder neural network layers that are shared between images from the source and target domains to generate a high-level feature representation of features of the input source domain image; and
processing the high-level feature representation of the features of the input source domain image using one or more target domain low-level decoder neural network layers that are specific to generating images from the target domain to generate an output target domain image that is from the target domain but that has similar semantics to the input source domain image.

15. The system of claim 14, the operations further comprising:
receiving an input target domain image from a target domain;
processing the input target domain image using one or more target domain low-level encoder neural network layers that are specific to images from the target domain to generate a low-level representation of the input target domain image;
processing the low-level representation using the one or more high-level encoder neural network layers that are shared between images from the source and target domains to generate an embedding of the input target domain image;
processing the embedding of the input target domain image using the one or more high-level decoder neural network layers that are shared between images from the source and target domains to generate a high-level feature representation of features of the input target domain image; and
processing the high-level feature representation of the features of the target source domain image using one or more source domain low-level decoder neural network layers that are specific to generating images from the source domain to generate an output source domain image that is from the source domain but that has similar semantics to the input target domain image.

16. The system of claim 14, wherein the source domain low-level encoder neural network layers, the high-level encoder neural network layers, the high-level decoder neural network layers, and the target domain low-level decoder neural network layers have been trained jointly with one or more target domain low-level encoder neural network layers and one or more source domain low-level decoder neural network layers.

17. The system of claim 15, wherein the source domain low-level encoder neural network layers have a same architecture as the target domain low-level encoder neural network layers but different parameter values.

18. The system of claim 15, wherein the source domain low-level decoder neural network layers have a same architecture as the target domain low-level decoder neural network layers but different parameter values.

* * * * *